US012617097B2

(12) United States Patent
Rakshit et al.

(10) Patent No.:  US 12,617,097 B2
(45) Date of Patent:          May 5, 2026

(54) DYNAMIC ALTERATION OF OPERATIONAL PARAMETERS OF A MACHINE

(71) Applicant: INTERNATIONAL BUSINESS MACHINES CORPORATION, Armonk, NY (US)

(72) Inventors: Sarbajit K. Rakshit, Kolkata (IN); Carolina Garcia Delgado, Zapopan (MX); Tushar Agrawal, West Fargo, ND (US); Neil Delima, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 18/497,084

(22) Filed: Oct. 30, 2023

(65) Prior Publication Data

US 2025/0135650 A1     May 1, 2025

(51) Int. Cl.
*B25J 9/16*          (2006.01)

(52) U.S. Cl.
CPC ................................... *B25J 9/1694* (2013.01)

(58) Field of Classification Search
CPC . B25J 9/1694; B25J 5/007; B25J 9/162; B25J 9/1656; B25J 9/1661; B25J 9/1664;
(Continued)

(56) References Cited

U.S. PATENT DOCUMENTS

| | | | | |
|---|---|---|---|---|
| 11,648,847 | B1 * | 5/2023 | Ng | B60L 58/12 |
| | | | | 320/109 |
| 2018/0308069 | A1 * | 10/2018 | Starks | G06Q 10/063116 |

(Continued)

FOREIGN PATENT DOCUMENTS

| | | |
|---|---|---|
| CN | 112426116 A | 3/2021 |
| CN | 115277742 A | 11/2022 |

(Continued)

OTHER PUBLICATIONS

Disclosed Anonymously, "Method and System for Identifying the Optimum Position of Maintenance Units in Any Multi-Robotic Ecosystem with AR Visualization", IPCOM000272166D, Apr. 24, 2023, 4 pages.

(Continued)

*Primary Examiner* — Esvinder Singh
(74) *Attorney, Agent, or Firm* — Robert R. Aragona

(57) ABSTRACT

An embodiment for altering operational parameters of a machine in a multi-machine environment is provided. The embodiment may include receiving an IoT feed from one or more IoT devices and data relating to an activity in a multi-machine environment. The embodiment may also include identifying a health condition of one or more machines. The embodiment may further include in response to determining at least one machine of the one or more machines requires one or more maintenance actions, identifying a timeframe during which the one or more maintenance actions are able to be performed. The embodiment may also include updating a movement path of one or more service robots in the multi-machine environment. The embodiment may further include deploying the one or more service robots to execute the one or more maintenance actions. The embodiment may also include adapting one or more operational parameters of the one or more machines.

20 Claims, 3 Drawing Sheets

(58) Field of Classification Search

CPC ...... B25J 9/1674; B25J 9/1679; B25J 11/008; B25J 11/0085; A47L 2201/04; A47L 2201/00; A47L 2201/06; G05B 23/0283; G05B 2219/24001; G05B 2219/31004; G05B 2219/32234; G05B 2219/42271; G05B 2219/2618; G05B 2219/45084; G06Q 10/063114; G06Q 10/063116; G06Q 10/06314; G06Q 10/20; G06Q 10/06311; G06Q 10/06312; G06Q 10/06316; G16Y 10/25; G16Y 40/20; G16Y 40/40; G05D 2105/45; G05D 2105/47; G05D 1/648; G05D 1/0027; G05D 1/0287; G05D 1/0291

See application file for complete search history.

(56) References Cited

U.S. PATENT DOCUMENTS

| | | | |
|---|---|---|---|
| 2018/0333845 A1 | 11/2018 | Williams | |
| 2019/0055015 A1* | 2/2019 | Allard | G05D 1/0038 |
| 2019/0134821 A1* | 5/2019 | Patrick | B25J 9/1697 |
| 2021/0326770 A1* | 10/2021 | Mendes | G06F 21/32 |
| 2022/0197306 A1* | 6/2022 | Cella | H04L 63/1441 |
| 2022/0250245 A1 | 8/2022 | Panigrahi et al. | |
| 2022/0400925 A1 | 12/2022 | Hoobler et al. | |
| 2023/0267424 A1* | 8/2023 | Chen | G06Q 10/06311 |
| | | | 705/305 |
| 2023/0415336 A1* | 12/2023 | Ganju | B25J 9/163 |

FOREIGN PATENT DOCUMENTS

| | | |
|---|---|---|
| CN | 115517581 A | 12/2022 |
| CN | 115530674 A | 12/2022 |
| CN | 116107282 B | 6/2023 |
| CN | 116408806 A | 7/2023 |
| WO | 2025/093215 A1 | 5/2025 |

OTHER PUBLICATIONS

Grand View Research, "Professional Service Robots Market Size, Share & Trends Analysis Report By Application (Logistics, Healthcare, Customer Service, Field Robots), And Segment Forecasts, 2020-2027", https://www.grandviewresearch.com/industry-analysis/professional-service-robots-market, Accessed on Oct. 10, 2023, 6 Pages.

IBM, "IBM Robotic Process Automation", https://www.ibm.com/products/robotic-process-automation?mhsrc=ibmsearch_a&mhq=robotic, Accessed on Oct. 10, 2023, 15 Pages.

International Searching Authority, "Notification of Transmittal of the International Search Report and the Written Opinion of the International Searching Authority, or Declaration," Patent Cooperation Treaty, Dec. 13, 2024, 43 pages, International Application No. PCT/EP2024/077709, IBM.

* cited by examiner

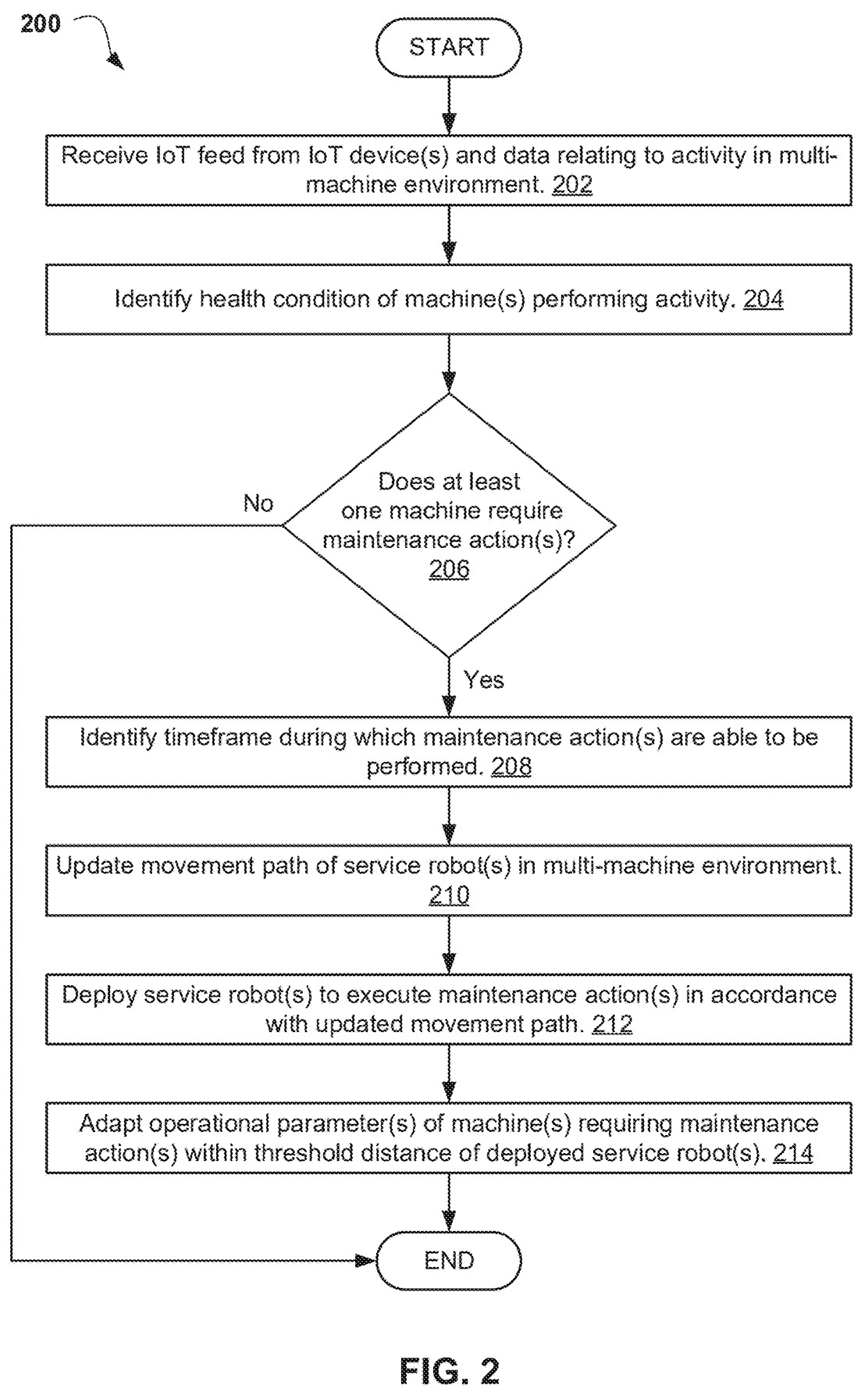

200

START

Receive IoT feed from IoT device(s) and data relating to activity in multi-machine environment. 202

Identify health condition of machine(s) performing activity. 204

Does at least one machine require maintenance action(s)? 206

No

Yes

Identify timeframe during which maintenance action(s) are able to be performed. 208

Update movement path of service robot(s) in multi-machine environment. 210

Deploy service robot(s) to execute maintenance action(s) in accordance with updated movement path. 212

Adapt operational parameter(s) of machine(s) requiring maintenance action(s) within threshold distance of deployed service robot(s). 214

END

FIG. 2

DYNAMIC ALTERATION OF OPERATIONAL PARAMETERS OF A MACHINE

BACKGROUND

The present invention relates generally to the field of computing, and more particularly to a system for altering operational parameters of a machine in a multi-machine environment.

A variety of machines may perform various activities in an industrial environment. Occasionally, these machines may require servicing after the performance of the activities. For example, a machine may require cleaning after manufacturing a work product. Regular cleaning may help to remove dirt, dust, debris, and other contaminants that may accumulate on surfaces and components of the machines. Additionally, the cleaning may increase the lifespan and overall functioning of the machines. The servicing of the machines may be performed manually by a human and/or an automated system.

SUMMARY

According to one embodiment, a method, computer system, and computer program product for altering operational parameters of a machine in a multi-machine environment is provided. The embodiment may include receiving an IoT feed from one or more IoT devices and data relating to an activity in a multi-machine environment. The embodiment may also include identifying a health condition of one or more machines performing the activity based on the IoT feed. The embodiment may further include in response to determining at least one machine of the one or more machines requires one or more maintenance actions based on the identified health condition, identifying a timeframe during which the one or more maintenance actions are able to be performed. The embodiment may also include updating a movement path of one or more service robots in the multi-machine environment based on the identified timeframe. The embodiment may further include deploying the one or more service robots to execute the one or more maintenance actions in accordance with the updated movement path. The embodiment may also include adapting one or more operational parameters of the one or more machines within a threshold distance of the deployed one or more service robots.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 illustrates an operational flowchart for altering operational parameters of a machine in a multi-machine environment in an operational parameter alteration process according to at least one embodiment.

DETAILED DESCRIPTION

Figure 1:
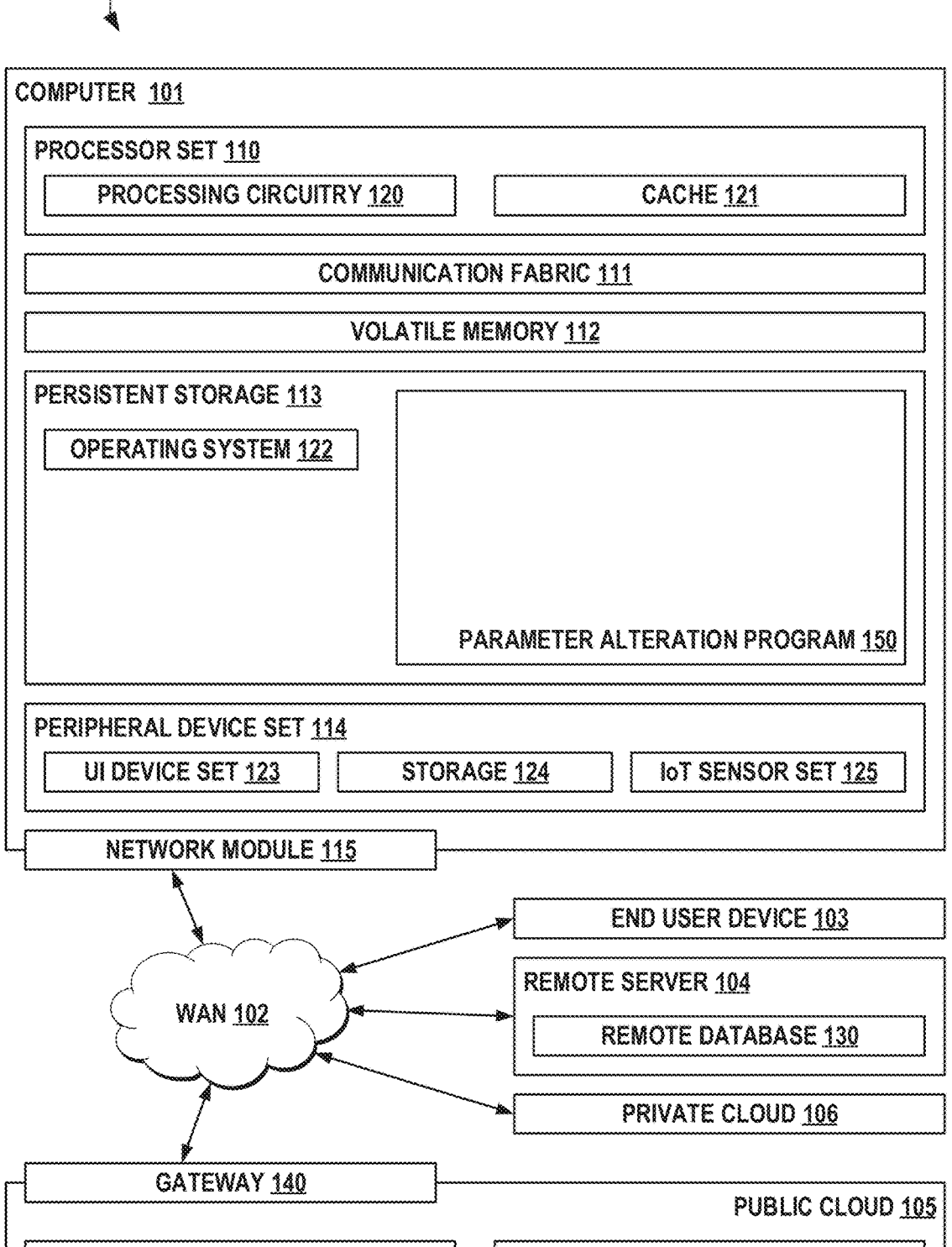
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for altering operational parameters of a machine in a multi-machine environment. The following described exemplary embodiments provide a system, method, and program product to, among other things, determine whether at least one machine of one or more machines requires one or more maintenance actions based on a health condition of the one or more machines and, accordingly, adapt one or more operational parameters of the at least one machine requiring the one or more maintenance actions that are within a threshold distance of deployed one or more service robots. Therefore, the present embodiment has the capacity to improve industrial technology by dynamically changing the operational parameters of a machine.

As previously described, a variety of machines may perform various activities in an industrial environment. Occasionally, these machines may require servicing after the performance of the activities. For example, a machine may require cleaning after manufacturing a work product. Regular cleaning may help to remove dirt, dust, debris, and other contaminants that may accumulate on surfaces and components of the machines. Additionally, the cleaning may increase the lifespan and overall functioning of the machines. The servicing of the machines may be performed manually by a human and/or an automated system. In performing the various activities, the machines may become contaminated with debris over time. For example, dust particles in the air may accumulate on the machines. This problem is typically addressed by deploying ground cleaning robots to sweep to-be-cleaned areas. However, sweeping the to-be-cleaned areas fails to change the operational parameters of the machines.

It may therefore be imperative to have a system in place to change the operational parameters of machines requiring servicing.

According to at least one embodiment, a computer-based method, computer system, and computer program product for altering operational parameters of a machine in a multi-machine environment is provided. The method comprises receiving an IoT feed from one or more IoT devices and data relating to an activity in a multi-machine environment, identifying a health condition of one or more machines performing the activity based on the IoT feed, determining whether at least one machine of the one or more machines requires one or more maintenance actions based on the identified health condition, in response to determining the at least one machine requires the one or more maintenance actions, identifying a timeframe during which the one or more maintenance actions are able to be performed, updating a movement path of one or more service robots in the multi-machine environment based on the identified timeframe, deploying the one or more service robots to execute the one or more maintenance actions in accordance with the updated movement path, and adapting one or more operational parameters of the one or more machines within a threshold distance of the deployed one or more service robots. This embodiment has the advantage of dynamically changing the operational parameters of a machine requiring maintenance.

According to at least one embodiment, deploying the one or more service robots to execute the one or more maintenance actions may further comprise bypassing, by the one or more service robots, one or more idle machines within the threshold distance that do not require the one or more maintenance actions, and predicting an updated timeframe for the deployed one or more service robots to return to the one or more idle machines to execute the one or more maintenance actions. This embodiment has the advantage of ensuring that machines will receive maintenance at a proper time.

According to at least one embodiment, identifying the timeframe during which the one or more maintenance actions are able to be performed may further comprise in response to determining the at least one machine requires multiple maintenance actions from multiple service robots, identifying a sequence in which the multiple service robots are to be deployed to execute the multiple maintenance actions. This embodiment has the advantage of optimizing the utilization of multiple service robots.

According to at least one embodiment, the identified sequence may include the multiple service robots executing a corresponding maintenance action on the at least one machine at a same time. This embodiment has the advantage of reducing the overall time spent in providing maintenance to a machine requiring multiple maintenance actions from different service robots.

According to at least one embodiment, adapting the one or more operational parameters of the one or more machines within the threshold distance may further comprise in response to determining the at least one machine is mobile, causing the at least one machine to move toward the deployed one or more service robots in the multi-machine environment. This embodiment has the advantage of optimizing the timing in which a machine receives required maintenance.

According to at least one embodiment, adapting the one or more operational parameters of the one or more machines within the threshold distance may further comprise causing the at least one machine to open a material collection tray in response to determining a threshold limit of scrap material has been collected. This embodiment has the advantage of reducing productivity loss of a machine that is overflowing with scrap material.

According to at least one embodiment, the adapted operational parameter may be a stopping of a motor. The stopping of the motor has the advantage of proactively readying a machine for maintenance. According to at least one embodiment, the adapted operational parameter may be a reduction in revolutions per minute (RPMs) of the motor. The reduction in the RPMs has the advantage of reducing the power consumption of a machine requiring maintenance. According to at least one embodiment, the adapted operational parameter may be a reduction in a cutting speed of the at least one machine. The reduction in the cutting speed has the advantage of reducing a wear and tear of a machine requiring maintenance.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to determine whether at least one machine of one or more machines requires one or more maintenance actions based on a health condition of the one or more machines and, accordingly, adapt one or more operational parameters of the at least one machine requiring the one or more maintenance actions that are within a threshold distance of deployed one or more service robots.

Referring to FIG. 1, an exemplary computing environment 100 is depicted, according to at least one embodiment. Computing environment 100 contains an example of an environment for the execution of at least some of the computer code involved in performing the inventive methods, such as a parameter alteration program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include an industrial machine, a service robot, a drone, and/or any other device for performing labor related tasks.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the parameter alteration program 150 may be a program capable of receiving an IoT feed from one or more IoT devices and data relating to an activity in a multi-machine environment, determining whether at least one machine of one or more machines requires one or more maintenance actions based on a health condition of the one or more machines, and adapting one or more operational parameters of the at least one machine requiring the one or more maintenance actions that are within a threshold distance of deployed one or more service robots. Furthermore, notwithstanding depiction in computer 101, the parameter alteration program 150 may be stored in and/or executed by, individually or in any combination, end user device 103, remote server 104, public cloud 105, and private cloud 106. The parameter alteration method is explained in further detail below with respect to FIG. 2. It may be appreciated that the examples described below are not intended to be limiting, and that in embodiments of the present invention the parameters used in the examples may be different.

Referring now to FIG. 2, an operational flowchart for altering operational parameters of a machine in a multi-machine environment in an operational parameter alteration process 200 is depicted according to at least one embodiment. At 202, the parameter alteration program 150 receives the IoT feed from the one or more IoT devices and the data relating to the activity in the multi-machine environment.

According to at least one embodiment, the IoT feed may be a video feed captured by a video camera and/or a drone in the multi-machine environment. For example, the video camera and/or the drone may capture dust particles in the air or on the ground. In another example, the video camera and/or the drone may capture oil or coolant on the ground near the one or more machines. According to at least one other embodiment, the IoT feed may be a sensor feed captured by IoT sensor set 125. The sensors in IoT sensor set 125 may be contained in the one or more machines. Examples of the sensors in IoT sensor set 125 may include, but are not limited to, a temperature sensor, an oil pressure sensor, a light sensor, and/or a rotational speed sensor. For example, the temperature sensor may capture the internal temperature of the one or more machines. In another example, the rotational speed sensor may capture the RPMs of a motor of the one or more machines.

The data relating to the activity may include the type of activity to be performed in the multi-machine environment. Examples of an activity may include, but are not limited to, assembling objects in a manufacturing facility, 3D printing objects, cutting metal objects, removing objects in a disaster recovery area, and transporting objects from one location to another (e.g., moving automobile parts from an assembly line to a loading dock). The data relating to the activity may also include the one or more objects associated with the activity. Examples of an object may include, but are not limited to, an automobile, a device on an assembly line, construction materials, and/or any object capable of being moved from a source to a destination, i.e., from one location to another. The data relating to the activity may further include the time required to complete the activity. For example, the activity may take two hours to complete.

Then, at 204, the parameter alteration program 150 identifies the health condition of the one or more machines performing the activity. The health condition is identified based on the IoT feed. In order to assess the health condition, the parameter alteration program 150 may access a database, such as remote database 130, containing information relating to normal operating conditions of the one or more machines.

For example, the database may specify that the internal temperature of the machine is not to exceed 150° F. Continuing the example, when the internal temperature of the machine exceeds 150° F., the health condition may be identified as poor. In another example, the database may specify that the oil pressure of the machine should be between 25 and 65 pounds per square inch (PSI). Continuing the example, when the oil pressure drops below 25 PSI or rises above 65 PSI, the health condition may be identified as poor. In yet another example, the database may specify there should be no fluid on the floor within five feet of the machine. Continuing the example, when coolant and/or oil has accumulated on the floor within five feet of the machine, the health condition may be identified as poor.

Next, at 206, the parameter alteration program 150 determines whether the at least one machine of the one or more machines requires the one or more maintenance actions. The determination is made based on the identified health condition. Examples of the maintenance action may include, but are not limited to, lubricating the at least one machine, applying oil and/or coolant to the at least one machine, cleaning the at least one machine, and/or collecting scrap material from the at least one machine. As described above with respect to step 204, when the health condition is identified as poor, the at least one machine may require the one or more maintenance actions.

For example, when the internal temperature of the machine exceeds 150° F., the health condition may be identified as poor and the maintenance action may be to apply the coolant to the at least one machine. In another example, when the oil pressure drops below 25 PSI or rises above 65 PSI, the health condition may be identified as poor and the maintenance action may be to apply the oil to the at least one machine. In yet another example, when coolant and/or oil has accumulated on the floor within five feet of the at least one machine, the health condition may be identified as poor and the maintenance action may be to sweep the floor near the at least one machine and to replenish the at least one machine with the coolant and/or oil. In a further example, when a threshold limit of scrap material has been collected, the health condition may be identified as poor and the maintenance action may be to remove the scrap material.

In response to determining the at least one machine requires the one or more maintenance actions (step 206, "Yes" branch), the operational parameter alteration process 200 proceeds to step 208 to identify the timeframe during which the one or more maintenance actions are able to be performed. In response to determining the at least one machine does not require the one or more maintenance actions (step 206, "No" branch), the operational parameter alteration process 200 ends.

Then, at 208, the parameter alteration program 150 identifies the timeframe during which the one or more maintenance actions are able to be performed. The timeframe may be identified based on historical data relating to the activity. As described above with respect to step 202, the data relating to the activity may include the time required to complete the activity and downtime during the activity. For example, the activity may take two hours to complete. The historical data may also include a time gap between activities, and the amount of time required to perform the one or more maintenance actions. For example, the time gap may be 30 minutes between a first activity and a second activity, and the amount of time required to perform the one or more maintenance actions may be 20 minutes. Thus, the identified timeframe may be a time period during which the at least one machine may be made idle.

For example, where machine "A" and machine "B" are the machines requiring the one or more maintenance actions, and where it takes five minutes to apply the oil and/or the coolant to machine "A" and 15 minutes to collect the scrap material from machine "B," the identified timeframe may be the 30 minutes between the first activity and the second activity. Continuing the example, where the 30 minutes between the first activity and the second activity occurs between 2:00 p.m. and 2:30 p.m., the timeframe to apply the oil and/or the coolant to machine "A" may be 2:00 p.m. until 2:05 p.m. and the timeframe to collect the scrap material from machine "B" may be 2:10 p.m. until 2:25 p.m.

According to at least one embodiment, in response to determining the at least one machine requires multiple maintenance actions from multiple service robots, a sequence in which the multiple service robots are to be deployed to execute multiple maintenance actions may be identified, described in further detail below with respect to step 210.

Next, at 210, the parameter alteration program 150 updates the movement path of the one or more service robots in the multi-machine environment. The movement path is updated based on the identified timeframe. Examples of the service robot may include, but are not limited to, a cleaning robot, a lubricating robot, and/or a material collection robot. The one or more service robots may be constantly moving in the multi-machine environment. The one or more service robots may move on the ground (e.g., an automated guided vehicle (AGV)) and/or in the air (e.g., the drone). For example, where machine "A" and machine "B" are the machines requiring the one or more maintenance actions, and where the timeframe to apply the oil and/or the coolant to machine "A" may be 2:00 p.m. until 2:05 p.m. and the timeframe to collect the scrap material from machine "B" may be 2:10 p.m. until 2:25 p.m., the updated movement path of the one or more service robots may be for the one or more service robots to travel to machine "A," perform the maintenance action, and then upon completion of the maintenance action travel to machine "B" to perform an additional maintenance action.

According to at least one embodiment, where the at least one machine requires the multiple maintenance actions from the multiple service robots, the sequence in which the multiple service robots are to be deployed to execute the multiple maintenance actions may be identified. For example, machine "A" may require the oil and/or the coolant and the removal of scrap material, and the adding of the oil and/or the coolant and the removal of scrap material may need to be performed by different service robots. Continuing the example, the identified sequence may be for the lubricating robot to apply the oil and/or the coolant, followed by the material collection robot to remove the scrap material.

According to at least one other embodiment, the identified sequence may include the multiple service robots executing a corresponding maintenance action on the at least one machine at a same time. For example, the lubricating robot may apply the oil and/or the coolant to machine "A" and the material collection robot may remove the scrap material from machine "A" at the same time.

Then, at 212, the parameter alteration program 150 deploys the one or more service robots to execute the one or more maintenance actions. The one or more service robots are deployed in accordance with the updated movement path. The parameter alteration program 150 may send a signal to the one or more service robots to deploy the one or more service robots to the at least one machine. For example, where machine "A" and machine "B" are the machines requiring the one or more maintenance actions, and where the updated movement path of the one or more service robots may be for the one or more service robots to travel to machine "A," perform the maintenance action, and then upon completion of the maintenance action travel to machine "B" to perform an additional maintenance action, the signal may be sent to the one or more service robots to deploy the one or more service robots to machine "A," followed by machine "B".

According to at least one embodiment, deploying the one or more service robots to execute the one or more maintenance actions may include bypassing, by the one or more service robots, one or more idle machines within the threshold distance that do not require the one or more maintenance actions. During the identified timeframe, the one or more idle machines may not yet require the one or more maintenance actions. For example, in addition to machine "A" and machine "B," machine "C" may also be idle between the first activity and the second activity. However, unlike machine "A" and machine "B," machine "C" may not require any maintenance action. In this example, the deployed one or more service robots may bypass (e.g., skip) machine "C" and execute the one or more maintenance actions on machine "A" and machine "B." An updated timeframe may then be predicted for the deployed one or more service robots to return to the one or more idle machines to execute the one or more maintenance actions. For example, where the identified timeframe is the 30 minutes between the first activity and the second activity, the updated timeframe may be the 30 minutes between the second activity and a third activity. Continuing the example, where the 30 minutes between the second activity and the third activity occurs between 3:00 p.m. and 3:30 p.m., the updated timeframe to execute the one or more maintenance actions on machine "C" may be between 3:00 p.m. and 3:30 p.m.

Next, at 214, the parameter alteration program 150 adapts the one or more operational parameters of the one or more machines within the threshold distance of the deployed one or more service robots. Examples of the adapted operational parameter may include, but are not limited to, a stopping of a motor, a reduction in RPMs of the motor, and/or a reduction in the cutting speed of the at least one machine. As the deployed one or more service robots move toward the at least one machine, the at least one machine may alter the one or more operational parameters when the deployed one or more service robots are within the threshold distance of the at least one machine. For example, the threshold distance may be 20 feet. Continuing the example, when the lubricating robot is within 20 feet of machine "A," machine "A" may alter the one or more operational parameters.

According to at least one embodiment, adapting the one or more operational parameters of the one or more machines within the threshold distance may include causing the at least one machine to open a material collection tray in response to determining a threshold limit of scrap material has been collected. For example, the threshold limit may be 10 pounds of scrap material. When the threshold limit is reached, the one or more service robots, such as the material collection robot, may be deployed to remove the scrap material from the material collection tray.

According to at least one other embodiment, adapting the one or more operational parameters of the one or more machines within the threshold distance may also include in response to determining the at least one machine is mobile, causing the at least one machine to move toward the deployed one or more service robots in the multi-machine environment. In this embodiment, the one or more service robots may be capable of providing the one or more maintenance actions to multiple machines at the same time. For example, where the machines requiring the one or more maintenance actions include machine "A," machine "B," and machine "C," and where machine "A" and machine "B" are mobile, machine "A" and machine "B" may move toward the one or more service robots.

Figure 3:
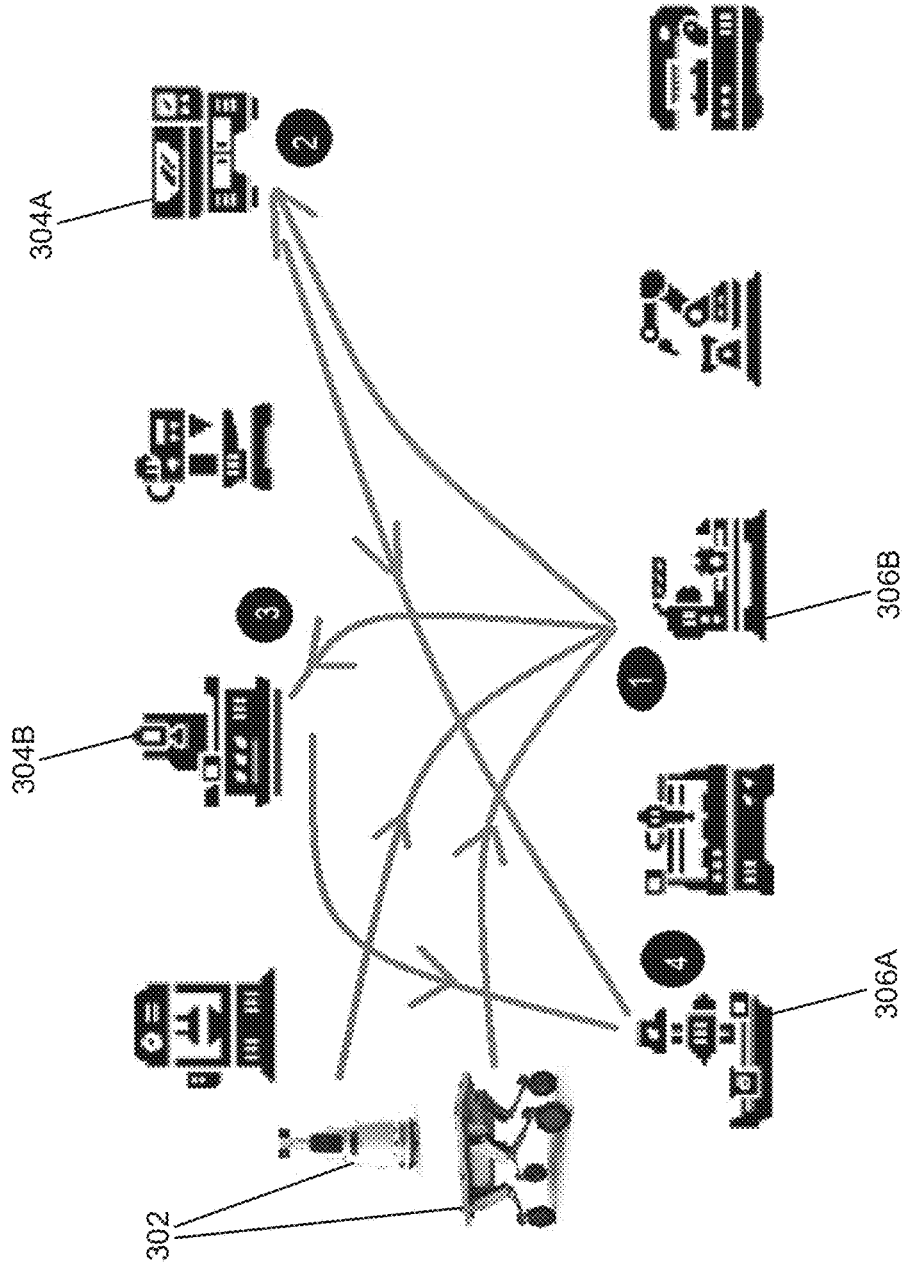
FIG. 3 is an exemplary diagram depicting service robots performing maintenance actions on machines according to at least one embodiment.

Referring now to FIG. 3, an exemplary diagram 300 depicting service robots 302 performing maintenance actions on machines 304A, 304B, 306A, 306B is shown according to at least one embodiment. In the diagram 300, the service robots 302 may be deployed in accordance with the updated movement path described above with respect to the description of FIG. 2. Arrows illustrate the updated movement path of the service robots 302. Machine "1," machine "2," machine "3," and machine "4" may be the machines requiring the one or more maintenance actions. A first plurality of machines 304A, 304B may require one or more maintenance actions from a single service robot of the service robots 302. A second plurality of machines 306A, 306B may require one or more maintenance actions from multiple service robots 302. As illustrated in the diagram 300, the service robots 302 may execute the one or more maintenance actions on the second plurality of machines 306A, 306B at the same time.

According to at least one embodiment, the service robots 302 may delay performing the one or more maintenance actions on the machines 304A, 304B, 306A, 306B in response to determining the machines 304A, 304B, 306A, 306B are operating to meet a service level agreement (SLA) for product delivery. The one or more maintenance actions may be executed on the machines 304A, 304B, 306A, 306B operating to meet the SLA during the updated timeframe, as described above with respect to the description of FIG. 2.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of altering operational parameters of a machine in a multi-machine environment, the method comprising:

receiving an IoT feed from one or more IoT devices and data relating to an activity in a multi-machine environment;

identifying a health condition of one or more machines performing the activity based on the IoT feed, wherein identifying the health condition includes detecting an external substance on a floor within a threshold distance of at least one machine of the one or more machines performing the activity;

determining whether the at least one machine of the one or more machines requires one or more maintenance actions based on the identified health condition, wherein the determination is made at least based on a presence of the external substance within the threshold distance of the at least one machine;

in response to determining the at least one machine requires the one or more maintenance actions, identifying a timeframe during which the one or more maintenance actions are able to be performed, wherein the identified timeframe includes a time gap between a first activity and a second activity, wherein the first activity and the second activity are different than the one or more maintenance actions;

updating a movement path of one or more service robots in the multi-machine environment based on the identified timeframe;

deploying the one or more service robots to execute the one or more maintenance actions in accordance with the updated movement path; and adapting one or more operational parameters of the one or more machines within a threshold distance of the deployed one or more service robots.

2. The computer-based method of claim 1, wherein deploying the one or more service robots to execute the one or more maintenance actions further comprises:

bypassing, by the one or more service robots, one or more idle machines within the threshold distance that do not require the one or more maintenance actions; and predicting an updated timeframe for the deployed one or more service robots to return to the one or more idle machines to execute the one or more maintenance actions.

3. The computer-based method of claim 1, wherein identifying the timeframe during which the one or more maintenance actions are able to be performed further comprises:

in response to determining the at least one machine requires multiple maintenance actions from multiple service robots, identifying a sequence in which the multiple service robots are to be deployed to execute the multiple maintenance actions.

4. The computer-based method of claim 3, wherein the identified sequence includes the multiple service robots executing a corresponding maintenance action on the at least one machine at a same time.

5. The computer-based method of claim 1, wherein adapting the one or more operational parameters of the one or more machines within the threshold distance further comprises:

in response to determining the at least one machine is mobile, causing the at least one machine to move toward the deployed one or more service robots in the multi-machine environment.

6. The computer-based method of claim 1, wherein adapting the one or more operational parameters of the one or more machines within the threshold distance further comprises:

causing the at least one machine to open a material collection tray in response to determining a threshold limit of scrap material has been collected.

7. The computer-based method of claim 1, wherein the adapted operational parameter is selected from a group consisting of a stopping of a motor, a reduction in revolutions per minute (RPMs) of the motor, and a reduction in a cutting speed of the at least one machine.

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving an IoT feed from one or more IoT devices and data relating to an activity in a multi-machine environment;

identifying a health condition of one or more machines performing the activity based on the IoT feed, wherein identifying the health condition includes detecting an external substance on a floor within a threshold distance of at least one machine of the one or more machines performing the activity;

determining whether the at least one machine of the one or more machines requires one or more maintenance actions based on the identified health condition, wherein the determination is made at least based on a presence of the external substance within the threshold distance of the at least one machine;

in response to determining the at least one machine requires the one or more maintenance actions, identifying a timeframe during which the one or more maintenance actions are able to be performed, wherein the identified timeframe includes a time gap between a first activity and a second activity, wherein the first activity and the second activity are different than the one or more maintenance actions;

updating a movement path of one or more service robots in the multi-machine environment based on the identified timeframe;

deploying the one or more service robots to execute the one or more maintenance actions in accordance with the updated movement path; and adapting one or more operational parameters of the one or more machines within a threshold distance of the deployed one or more service robots.

9. The computer system of claim 8, wherein deploying the one or more service robots to execute the one or more maintenance actions further comprises:

bypassing, by the one or more service robots, one or more idle machines within the threshold distance that do not require the one or more maintenance actions; and predicting an updated timeframe for the deployed one or more service robots to return to the one or more idle machines to execute the one or more maintenance actions.

10. The computer system of claim 8, wherein identifying the timeframe during which the one or more maintenance actions are able to be performed further comprises:

in response to determining the at least one machine requires multiple maintenance actions from multiple service robots, identifying a sequence in which the multiple service robots are to be deployed to execute the multiple maintenance actions.

11. The computer system of claim 10, wherein the identified sequence includes the multiple service robots executing a corresponding maintenance action on the at least one machine at a same time.

12. The computer system of claim 8, wherein adapting the one or more operational parameters of the one or more machines within the threshold distance further comprises:

in response to determining the at least one machine is mobile, causing the at least one machine to move toward the deployed one or more service robots in the multi-machine environment.

13. The computer system of claim 8, wherein adapting the one or more operational parameters of the one or more machines within the threshold distance further comprises:

causing the at least one machine to open a material collection tray in response to determining a threshold limit of scrap material has been collected.

14. The computer system of claim 8, wherein the adapted operational parameter is selected from a group consisting of a stopping of a motor, a reduction in revolutions per minute (RPMs) of the motor, and a reduction in a cutting speed of the at least one machine.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving an IoT feed from one or more IoT devices and data relating to an activity in a multi-machine environment;

identifying a health condition of one or more machines performing the activity based on the IoT feed, wherein identifying the health condition includes detecting an external substance on a floor within a threshold distance of at least one machine of the one or more machines performing the activity;

determining whether the at least one machine of the one or more machines requires one or more maintenance actions based on the identified health condition, wherein the determination is made at least based on a presence of the external substance within the threshold distance of the at least one machine;

in response to determining the at least one machine requires the one or more maintenance actions, identifying a timeframe during which the one or more maintenance actions are able to be performed, wherein the identified timeframe includes a time gap between a first activity and a second activity, wherein the first activity and the second activity are different than the one or more maintenance actions;

updating a movement path of one or more service robots in the multi-machine environment based on the identified timeframe;

deploying the one or more service robots to execute the one or more maintenance actions in accordance with the updated movement path; and adapting one or more operational parameters of the one or more machines within a threshold distance of the deployed one or more service robots.

16. The computer program product of claim 15, wherein deploying the one or more service robots to execute the one or more maintenance actions further comprises:

bypassing, by the one or more service robots, one or more idle machines within the threshold distance that do not require the one or more maintenance actions; and predicting an updated timeframe for the deployed one or more service robots to return to the one or more idle machines to execute the one or more maintenance actions.

17. The computer program product of claim 15, wherein identifying the timeframe during which the one or more maintenance actions are able to be performed further comprises:

in response to determining the at least one machine requires multiple maintenance actions from multiple service robots, identifying a sequence in which the multiple service robots are to be deployed to execute the multiple maintenance actions.

18. The computer program product of claim 17, wherein the identified sequence includes the multiple service robots executing a corresponding maintenance action on the at least one machine at a same time.

19. The computer program product of claim 15, wherein adapting the one or more operational parameters of the one or more machines within the threshold distance further comprises:

in response to determining the at least one machine is mobile, causing the at least one machine to move toward the deployed one or more service robots in the multi-machine environment.

20. The computer program product of claim 15, wherein adapting the one or more operational parameters of the one or more machines within the threshold distance further comprises:

causing the at least one machine to open a material collection tray in response to determining a threshold limit of scrap material has been collected.

* * * * *